No. 849,697. PATENTED APR. 9, 1907.
J. C. POTTER & J. JOHNSTON.
CLUTCH.
APPLICATION FILED JAN. 17, 1902.
2 SHEETS—SHEET 1.
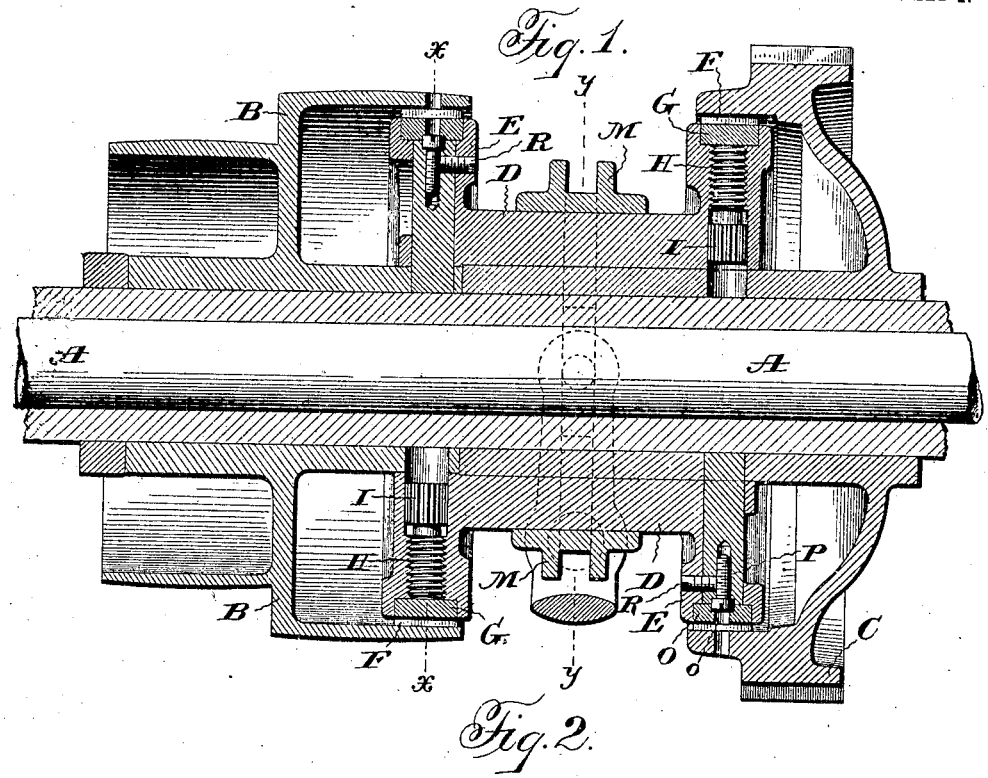
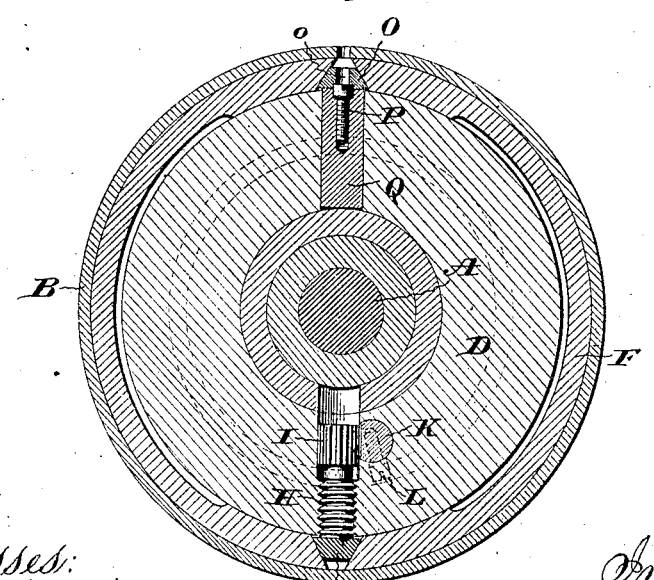
Witnesses:
Jas. E. Hutchinson
Henry C. Hazard
Inventors.
Jas. C. Potter and Jno. Johnston,
by Edwin J. Prindle,
their Attorney.

No. 849,697. PATENTED APR. 9, 1907.
J. C. POTTER & J. JOHNSTON.
CLUTCH.
APPLICATION FILED JAN. 17, 1902.
2 SHEETS—SHEET 2.
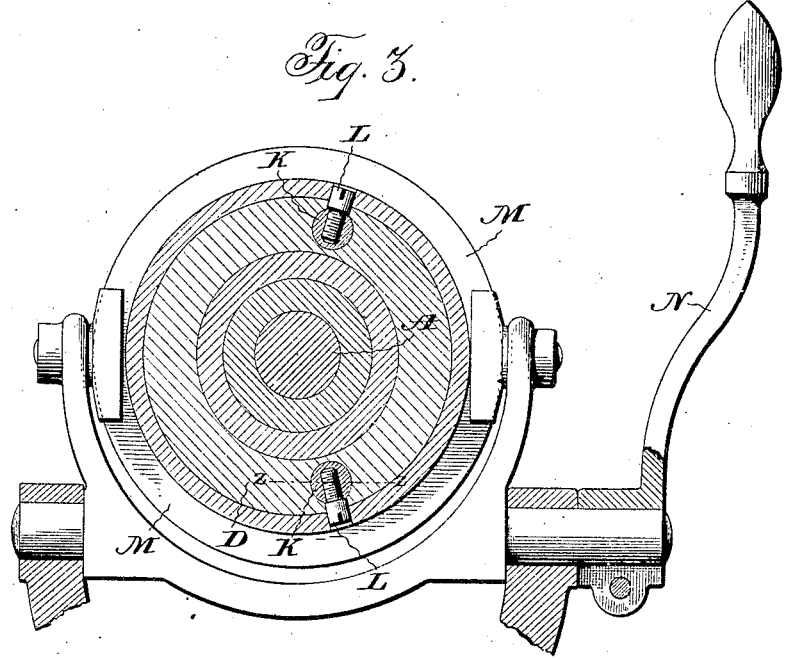
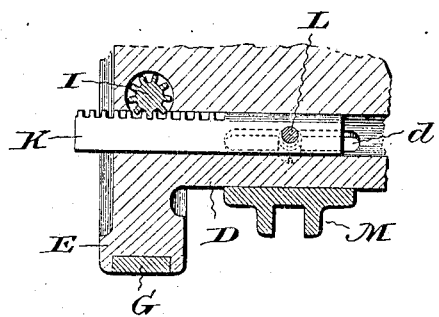

UNITED STATES PATENT OFFICE.

JAMES C. POTTER AND JOHN JOHNSTON, OF PAWTUCKET, RHODE ISLAND, ASSIGNORS TO POTTER AND JOHNSTON MACHINE COMPANY, OF PAWTUCKET, RHODE ISLAND.

CLUTCH.

No. 849,697.     Specification of Letters Patent.     Patented April 9, 1907.

Application filed January 17, 1902. Serial No. 90,159.

*To all whom it may concern:*

Be it known that we, JAMES C. POTTER and JOHN JOHNSTON, of Pawtucket, in the county of Providence, and in the State of Rhode Island, have invented certain new and useful Improvements in Clutches; and we do hereby declare that the following is a full, clear, and exact description thereof, reference being had to the accompanying drawings, in which—

Figure 1 is a vertical section of our clutch. Fig. 2 is a cross-section thereof on the line $x\ x$ of Fig. 1. Fig. 3 is a cross-section on the line $y\ y$ of Fig. 1; and Fig. 4 is a detail view in section, showing the wedge-operating mechanism.

Letters of like name and kind refer to like parts in each of the figures.

The object of our invention is to provide a clutch of simple and cheap construction; and to this end our invention consists in the clutch having the features of construction substantially as hereinafter specified and claimed.

In the embodiment of our invention which we have selected for illustration our clutch is shown adapted to connect either of two lathe-spindle-driving mechanisms to the spindle; but it is to be understood that such embodiment of the invention is not to be considered as in any wise exclusive, as we do not restrict ourselves to any particular relation in which to use the clutch or any particular adaptation of the parts thereof.

Describing such embodiment in detail, there are loosely mounted on the lathe-spindle A a cone-pulley B and a gear-wheel C, the latter being driven in a manner needless to be described. Fixed on the spindle between the pulley and the gear-wheel is a sleeve D, having at each end an annular flange E, one encircled by the pulley and the other by the gear-wheel or a flange thereon, but each of sufficiently less diameter than the encircling portion of the respective part to leave a clear space between. In the circumference of each flange E is an annular groove, within which is seated a ring divided at two diametrically opposite points and constituting two nearly-semicircular friction-shoes F and F, that are adapted to be expanded into contact with the adjacent encircling portion of the pulley or the gear-wheel, as the case may be. For expanding said shoes there is interposed between the adjacent ends thereof a tapering block or wedge G, the inner wider end of which is engaged by a screw H in a threaded radial opening in the sleeve D. At its inner end the screw has fixed to it a pinion I, with which meshes a rack K, by the reciprocation of which the pinion and the screw may be rotated. The rack is preferably in the form of a round bar slabbed off, having the teeth where it is slabbed off, and it is placed in an opening in the sleeve D. A screw L, passing through a slot $d$ in the sleeve D, connects the rack with a sliding collar M, encircling and splined to the sleeve, which is adapted to be moved in an axial direction by a hand-lever N in a well-known manner.

Between the ends of the shoes F and F, at a point diametrically opposite the wedge G, is a taper block or wedge O, the larger end of which is engaged by the head of a screw P. Said screw P engages a threaded opening in a plug Q, that fills a radial opening that is provided for assembling the parts diametrically opposite the opening in which the operating-screw H is placed. In line with the screw P the wedge O has a perforation $o$, and the pulley and gear-wheel have each a perforation in line with the screw P of the respective clutch, the object of said perforations being to enable a screw-driver to be applied to the screw P. The wedge O is provided as a means of adjustment of the shoes F and F to compensate for wear, and the screw P is a convenient means for moving the wedge for such adjustment. The wedge-moving screw P is locked or held by a lock-screw R, that impinges against the side thereof.

Preferably the shoes F and F are reduced in thickness intermediate their extremities, and the wedge-engaging portions are inclined in correspondence with the inclination of the wedges.

The operation of the clutch will be readily understood. By moving the collar M in one direction the operating-screw H will be revolved and the wedge G moved outward, expanding the shoes F and F and pressing them against the pulley or gear-wheel surface, while by moving the collar in the reverse direction the shoes F and F will contract and free or release the pulley or gear-wheel. In the particular adaptation of the clutch which we have shown either the pulley or the gear-wheel may be engaged or both disengaged by stopping the collar M at an intermediate position. The clutch, as will be perfectly obvious, can be employed for rotatively connecting one wheel or revoluble part and a shaft or spindle, and we therefore do not limit ourselves to an arrangement such as that illustrated, wherein a double form is given the clutch to enable it to connect either of two revoluble parts to a shaft or spindle.

Our clutch is of very simple construction, its parts being few, it can be operated easily, and it does its work most efficiently.

Having thus described our invention, what we claim is—

1. In a clutch, the combination of independent unattached segment-form shoes, a surface for the latter to act on a wedge between separated ends of said segments, shoe-operating mechanism acting on said wedge to cause movement of the shoes in clutching and unclutching, a second wedge interposed between other separated ends of the segments, and mechanism acting on said second wedge, solely for adjustment of the shoes and independent of the shoe-operating mechanism, whereby it is operative independently of the latter and is not actuated when the shoe-operating mechanism is operated.

2. In a clutch, the combination of a pair of independent unattached segment-form shoes, a surface for the latter to act on a wedge interposed between the ends of the segments at one of their points of separation, shoe-operating mechanism acting on said wedge, solely to cause movement of the shoes in clutching and unclutching, said mechanism comprising a screw that engages the wedge, a pinion connected to the screw, and a reciprocable rack, a second wedge interposed between said shoes at another point of separation, and shoe-adjusting mechanism acting on the other wedge, solely for the purpose of adjustment and independent of the shoe-operating mechanism, whereby it is operative independently of the latter and is not actuated when the shoe-operating mechanism is operated.

In testimony that we claim the foregoing we have hereunto set our hands this 31st day of August, A. D. 1901.

JAMES C. POTTER.
JOHN JOHNSTON.

Witnesses:
JAMES L. JENKS,
FLORENCE E. BATES.